United States Patent
Schneider (10) Patent No.: US 8,347,374 B2
(45) Date of Patent: Jan. 1, 2013

(54) ADDING CLIENT AUTHENTICATION TO NETWORKED COMMUNICATIONS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 778 days.

(21) Appl. No.: 11/940,951

(22) Filed: Nov. 15, 2007

(65) Prior Publication Data

US 2009/0133113 A1 May 21, 2009

(51) Int. Cl.
*G06F 7/04* (2006.01)
(52) U.S. Cl. .......................................... 726/12
(58) Field of Classification Search .................. 726/12
See application file for complete search history.

(56) References Cited

U.S. PATENT DOCUMENTS

| | | | | |
|---|---|---|---|---|
| 5,764,890 A * | 6/1998 | Glasser et al. | ........... | 726/11 |
| 6,957,199 B1 * | 10/2005 | Fisher | ........... | 705/78 |
| 7,127,605 B1 * | 10/2006 | Montgomery et al. | ........... | 713/150 |
| 7,171,662 B1 * | 1/2007 | Misra et al. | ........... | 717/177 |
| 7,360,075 B2 * | 4/2008 | VanHeyningen et al. | ........... | 713/151 |
| 7,370,350 B1 * | 5/2008 | Salowey | ........... | 726/7 |
| 7,370,351 B1 * | 5/2008 | Ramachandran et al. | ........... | 726/8 |
| 7,458,095 B2 * | 11/2008 | Forsberg | ........... | 726/3 |
| 7,549,048 B2 * | 6/2009 | Freeman et al. | ........... | 713/171 |
| 7,801,827 B2 * | 9/2010 | Bishop et al. | ........... | 705/67 |
| 2002/0114469 A1 * | 8/2002 | Faccin et al. | ........... | 380/270 |
| 2002/0157019 A1 * | 10/2002 | Kadyk et al. | ........... | 713/201 |
| 2003/0005280 A1 * | 1/2003 | Bobde et al. | ........... | 713/150 |
| 2003/0028763 A1 * | 2/2003 | Malinen et al. | ........... | 713/155 |
| 2004/0034773 A1 * | 2/2004 | Balabine et al. | ........... | 713/168 |
| 2004/0221154 A1 * | 11/2004 | Aggarwal | ........... | 713/151 |
| 2004/0230831 A1 * | 11/2004 | Spelman et al. | ........... | 713/201 |
| 2004/0268150 A1 * | 12/2004 | Aaron | ........... | 713/201 |
| 2005/0074126 A1 * | 4/2005 | Stanko | ........... | 380/279 |
| 2005/0210252 A1 * | 9/2005 | Freeman et al. | ........... | 713/171 |
| 2005/0246282 A1 * | 11/2005 | Naslund et al. | ........... | 705/52 |
| 2006/0155995 A1 * | 7/2006 | Torvinen et al. | ........... | 713/169 |
| 2006/0230265 A1 * | 10/2006 | Krishna | ........... | 713/158 |
| 2007/0101412 A1 * | 5/2007 | Yang et al. | ........... | 726/5 |
| 2008/0043758 A1 * | 2/2008 | Giaretta et al. | ........... | 370/400 |
| 2009/0006840 A1 * | 1/2009 | Birger et al. | ........... | 713/151 |
| 2009/0013381 A1 * | 1/2009 | Torvinen et al. | ........... | 726/3 |

* cited by examiner

*Primary Examiner* — Techane Gergiso
(74) *Attorney, Agent, or Firm* — Lowenstein Sandler PC (57) ABSTRACT

A pass-through agent receives a request from a client and authenticates the client before forwarding the request to a target server that lacks client authentication capability. The target server is configured to accept requests from the pass-through agent, and may be configured to reject requests that do not come from the pass-through agent.

22 Claims, 6 Drawing Sheets

ADDING CLIENT AUTHENTICATION TO NETWORKED COMMUNICATIONS

FIELD

The invention relates to network communications and security. In particular, the invention relates to authenticating proxy agents for servers that lack authentication, and legacy applications that are not network-enabled.

BACKGROUND

Most computer communications over a distributed data network occur via point-to-point connections. Some applications use multicast or broadcast techniques, but in general, communications involve just two entities (often programs). Communicating parties must agree on a protocol: a sequence of messages and responses that permit the parties to reliably exchange data or commands. If one party attempts to use a different protocol, communication may fail. (Some protocols are self-documenting, so that a party that does not understand every message can nonetheless locate the message boundaries and ignore an unknown message. However, if the ignored message is critical to the parties' interaction, the interaction will still fail.)

Changes to protocols can be difficult to make because of the practical requirement that parties speak the same "language." When there is a large installed base of either clients or servers (or both), an upgraded protocol must either be backwards-compatible, or implementers must tolerate failed communication attempts until all of the clients and servers use the new protocol. Another circumstance that can impede deployment of an improved protocol is the unavailability of essential software source code, functional libraries or development tools. For example, consider the problem of adding authentication and/or encryption to a client-server interaction protocol that presently uses an ordinary Transmission Control Protocol ("TCP") connection. The Secure Sockets Layer ("SSL") provides a rich set of functions to perform authentication and encryption, but those functions cannot simply be "dropped in" by changing a shared object or dynamically-linked library ("DLL"). Instead, the server and client must be modified at least slightly (so the source code of each must be available), and the appropriate SSL libraries must be obtained. Source code is sometimes unavailable (or is only available at significant cost or under onerous conditions); and SSL libraries for some systems may likewise be unavailable or expensive. In general, the cost of modifying a software system to use SSL may be out of proportion to the value of such modification. In such cases, an alternate means of adding certain security-related features to a data communication protocol may be preferred.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

An embodiment of the invention accepts requests arriving over a network for a target service, authenticates the requester, and passes the requests through to a target server. This arrangement permits strong authentication to be added to a server that lacks it, and allows legacy applications that are not network-enabled at all to communicate with authenticated, remote clients. The target server need not be modified, so availability or expense of source code and/or security libraries does not hinder the addition of security features.

Figure 1A:
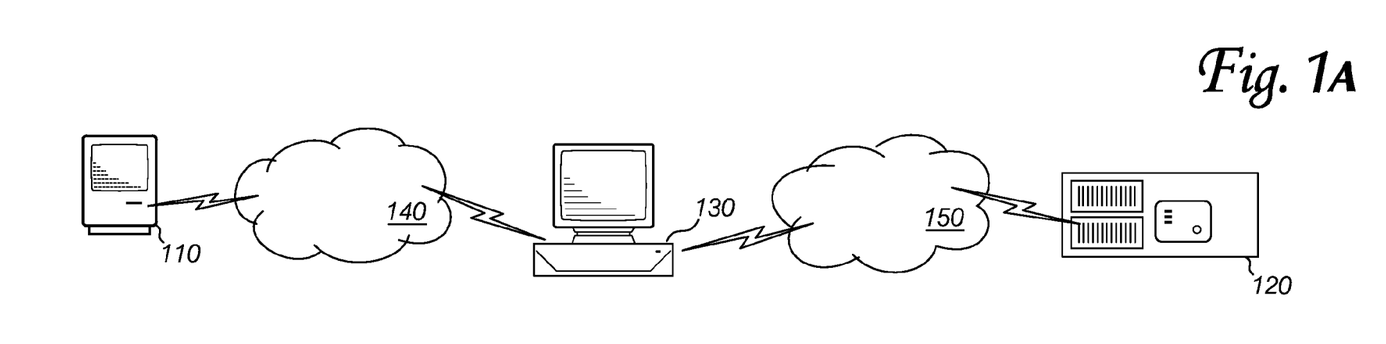
FIGS. 1A, 1B and 1C show several different network topologies where an embodiment of the invention may be employed.
Figure 1B:
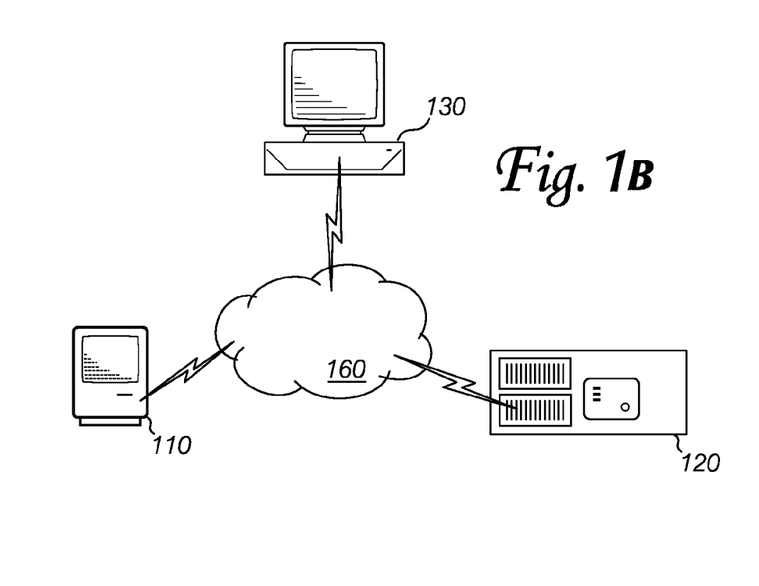
Figure 1C:
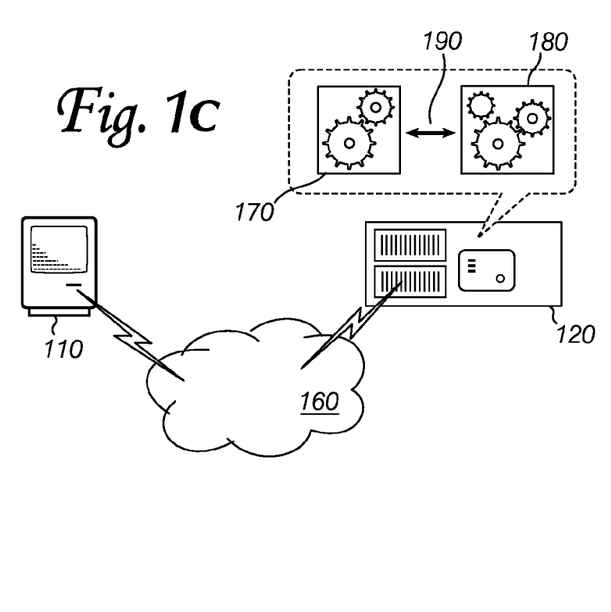

FIGS. 1A, 1B and 1C show several network topologies where an embodiment of the invention can be applied. In FIG. 1A, a client computer 110 is to use a service provided by server 120. It is further desired to restrict access to server 120 to clients that can authenticate themselves, but circumstances prevent the modification of software at server 120 to add such authentication. Thus, according to an embodiment of the invention, client system 110 establishes a connection with pass-through agent 130. Messages in this connection flow across a distributed data network represented as 140. Pass-through agent 130 authenticates client 110, and upon successful authentication, forwards the client's request to server 120 over distributed data network 150. It will be clear to those of skill in the relevant arts that the interactions between these three systems can occur over a variety of network topologies. For example, as shown in FIG. 1B, client 110 may communicate with pass-through agent 130, and pass-through agent 130 may communicate with server 120, over a common distributed data network 160. Network 160 may be, for example, the Internet. In a preferred embodiment, pass-through agent functionality 170 and server functionality 180 may both be provided by processes executing at a single computer system 120. In this arrangement, a private connection 190 may be provided between pass-through agent 170 and server 180, so that any requests to server 180 must be forwarded by pass-through agent 170. Private connection 190 may be, for example, an intra-computer communication facility or a "localhost" network connection.

Figure 2:
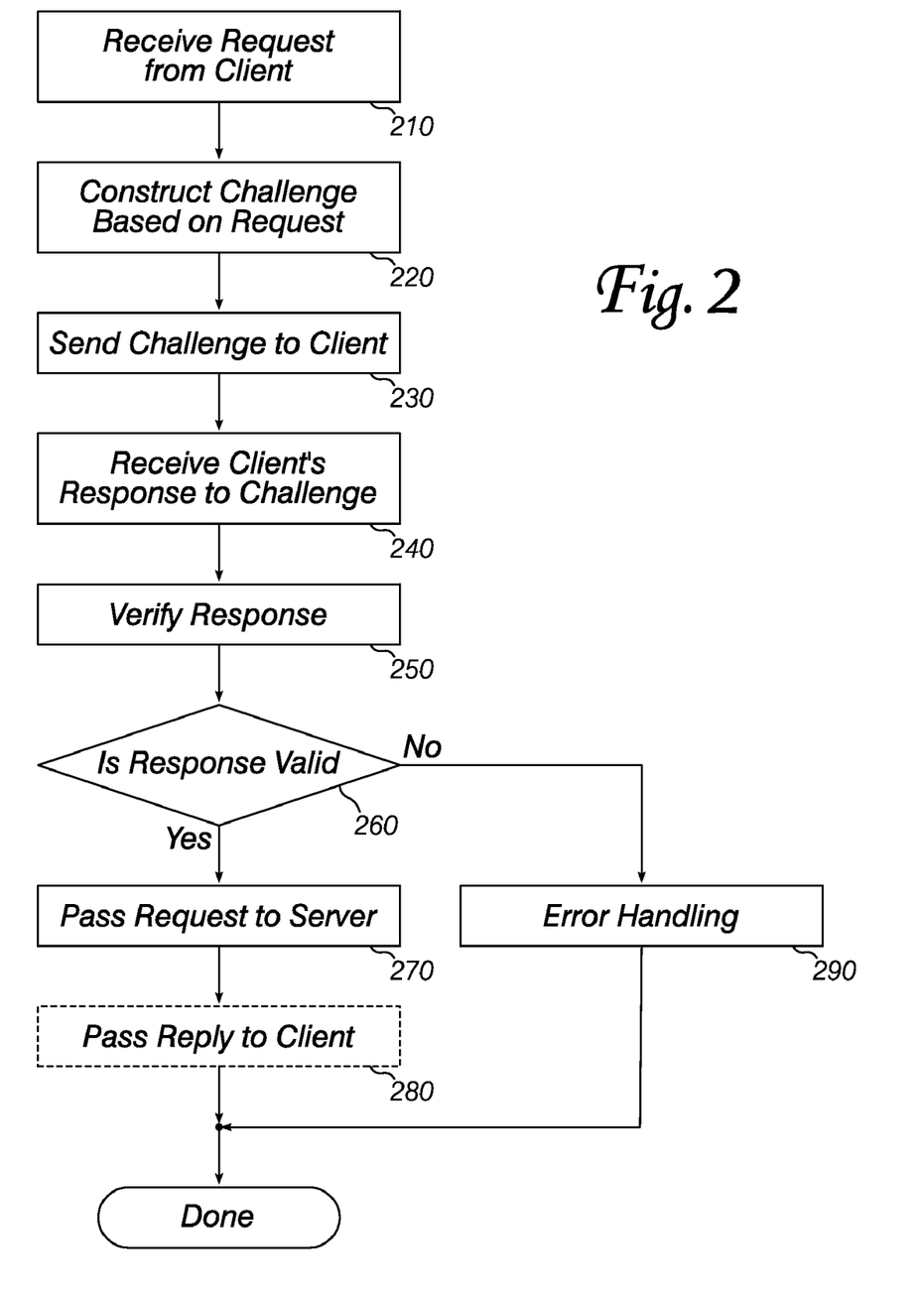
FIG. 2 is a flow chart outlining operations according to an embodiment.

A pass-through agent according to an embodiment of the invention may operate along the lines described in the flow chart of FIG. 2. The agent receives a request from a client (210) and constructs a challenge based on the request (220). This challenge is transmitted to the client (230). The client answers the challenge (if it is able to do so) and the pass-through agent receives the client's response to the challenge (240). The response is verified (250), and if it is valid (260), the pass-through agent passes the request to the server (270). Any reply from the server may be passed back to the client (280). If the client's response to the challenge is not valid, the pass-through agent performs appropriate error handling (290). For example, the pass-through agent may respond with an error message, or may simply terminate the protocol interaction with the client.

Figure 3:
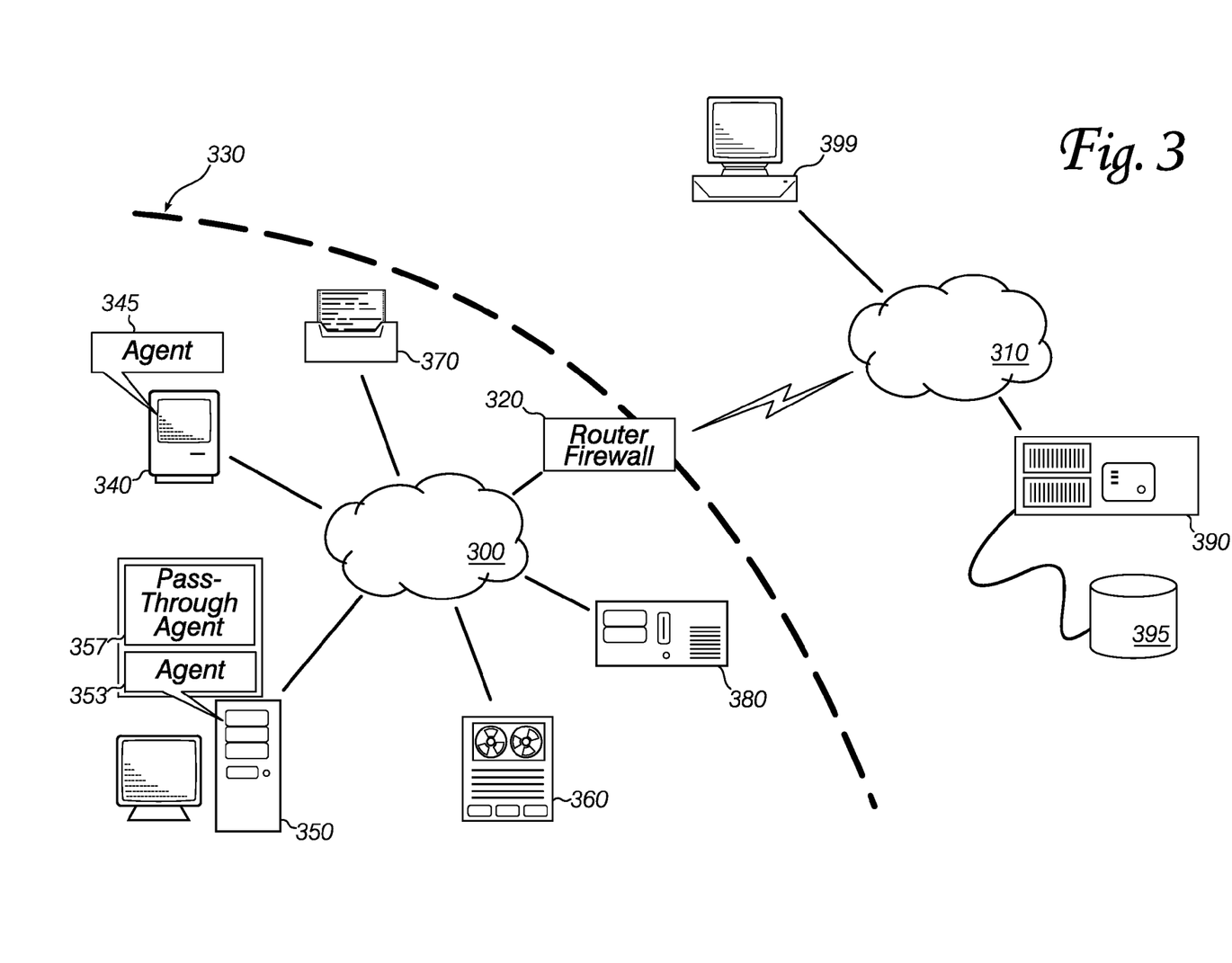
FIG. 3 shows an environment where a pass-through agent operates.

FIG. 3 shows a distributed data processing environment where an embodiment of the invention may be especially useful. A private distributed data network 300 is kept separate from a public distributed data network 310 by a device such as router-firewall 320. Network 300 may be, for example, a private corporate local area network ("LAN"), while network 310 may be the Internet. Router-firewall 320 establishes a boundary between the networks, shown in this Figure as heavy dashed line 330. Router-firewall 320 restricts the sorts of data communication connections that can be established between devices "inside" boundary 330 and devices "outside" the boundary.

Those responsible for monitoring and maintaining the devices and networks inside boundary 330 have chosen to use an external network operations center ("NOC") service at system 390 to manage their network. (A state-of-the-art NOC is expensive to operate, so third-party services are attractive alternatives for many enterprises with small- or medium-size networks of modest complexity.)

The network traffic restrictions imposed by router-firewall 320 complicate the NOC's collection of status data and transmission of command and control directives. Rather than configure the firewall to permit NOC system 390 to communicate with any system behind boundary 330, a single "internal" data collection and command-issuing system 380 is deployed. System 380 is a "NOC proxy," and NOC system 390 communicates exclusively with that system. NOC proxy 380 can freely interact with other internal machines, such as personal computers 340 and 350, server 360, printer 370, and so on. Some of these machines will provide a management interface such as a Simple Network Management Protocol ("SNMP") agent, through which the NOC proxy 380 can obtain status information or issue commands. However, personal computers 340 and 350 lack SNMP agents, so alternative means must be used to monitor and control them.

Monitoring and control functions may be provided by a software agent 345 at system 340, or agent 353 at system 350. A basic agent may not need special security measures, but if the agent can examine sensitive system information or change system state (e.g., reboot the system), then it is may be advisable to implement a secure protocol between the agent and NOC proxy 380. Agent 345, running on an Apple Macintosh computer, can be modified relatively easily, since development tools and security libraries are readily available. However, agent 353, running on system 350, a personal computer using a Windows operating system from Microsoft Corporation of Redmond, Wash., cannot be modified as easily. For example, libraries to implement the Secure Sockets Layer ("SSL") protocol may be bundled with a premium software package that is prohibitively expensive. Furthermore, every Windows computer on which an agent is to be deployed may require its own license for the SSL libraries.

Therefore, according to an embodiment of the invention, a pass-through agent 357 is co-located with agent 353. NOC proxy 380 sends requests to pass-through agent 357, which responds with a challenge to ensure that the request is being sent from a legitimate system. If NOC proxy 380 responds correctly, the request is forwarded to agent 353, and any reply from the agent is sent back to NOC proxy 380. Agent 353 may be configured to accept only connections originating from the local machine (i.e., to use an intra-machine communication facility such as a pipe, Unix-domain socket or shared memory segment, or a network socket bound to the "localhost" or "loopback" address). This configuration prevents a malicious entity from simply bypassing the pass-through agent 357 and sending requests directly to agent 353. (If the malicious entity already has access to computer 350 itself, the security provided by an embodiment of the invention is largely irrelevant.)

In this environment, NOC proxy 380 is serving as an intermediate between the systems within boundary 330 and NOC system 390. Other security measures may be implemented between NOC 390 and NOC proxy 380.

As described above, pass-through agent 357 can provide security when it is impractical to modify agent 353 to enforce client authentication procedures. However, pass-through agent 357 can also be used to provide authenticated access to software services that are not network-enabled at all. For example, a program that is designed to receive data from a local source such as a pipe or socket, process the data, and provide the results to a local consumer via another pipe or socket; can be invoked by the pass-through agent to process data received from an authenticated, remote client communicating with the pass-through agent via a network connection. One implication of this capability is that programs which usually rely on direct user interaction can be operated remotely. For example, many applications designed for use with the Windows operating system from Microsoft Corporation of Redmond, Wash., operate in response to "events" received from a message queue. Normally, the events are posted to the queue by the operating system, in response to mouse motions, clicks, and keystrokes performed by the user. (The event queue, operating system and user interface devices are all part of a local system.) However, an embodiment of the invention can receive event-like messages from the authenticated, remote client via a network connection, and post corresponding synthetic event messages to a local message queue. In this way, a script program at the remote client system can control a graphical user interface ("GUI") application at the system where the pass-through agent operates. With additional support for examining the state of the GUI, transmitting the state information to the remote system, and producing a replica of the GUI state, a user at the remote system could even interact with the GUI application at the pass-through agent's system.

In the foregoing description, note that agent 353 need not be modified at all. It implements its accustomed protocol and performs its functions as if the pass-through agent 357 was its client. The authentication of the ultimate client (in this example, NOC proxy 380) occurs strictly between the pass-through agent 357 and NOC proxy 380. Agent 353 may be incapable of constructing a challenge or validating a response, but this is unimportant because no challenge is ever presented to agent 353. In fact, when pass-through agent 357 is used to provide authenticated network access to a software service that is not network-enabled, agent 353 may be incapable even of communicating over the network with a client (e.g., NOC proxy 380). Pass-through agent 357 may be thought of as providing a network protocol "wrapper" for interactions between agent 353 and a client. The challenge-and-response interaction comprise an outer layer that is removed by the pass-through agent, leaving an inner protocol to carry messages between the agent and its client. The inner protocol may be a network protocol, an unstructured exchange of text strings, a stream of synthetic "user interface" messages, or some other series of interactions by which the client controls, interrogates or simply exchanges information with the agent.

In some embodiments, pass-through agent 357 may offer a protocol translation function, as well as its other functions described above. A somewhat contrived example of protocol translation follows. Suppose that a client sends a Hypertext Transfer Protocol ("HTTP") POST request. The pass-through agent may save the body of the POST request in a temporary file, prepare a challenge incorporating a portion of the request or a reference to the temporary file, and send the challenge to the client. The client solves the challenge and sends its response in the form of a second HTTP request. The pass-through agent validates the response, then transforms the previously-saved POST request body into a different request entirely. For example, the client's original request (that is, the POST request) may be converted to a File Transfer Protocol ("FTP") PUT command, a series of commands and messages for a Foxpro or MS Access database, etc.

The challenge transmitted by a pass-through agent according to an embodiment of the invention may be designed to verify that the would-be client has a cryptographic key or other secret information that corresponds with authorization to use the services protected by the pass-through agent. For example, the challenge may call for the client to decrypt a message or to compute a prime factor of a large number. These tasks are simple for a proper client that has the secret information, and infeasible for an impostor. The challenge may incorporate or be based on the request. This permits the client receiving the challenge to verify that the challenge corresponds to a request the client wishes to make.

In one embodiment, the pass-through agent selects a random number (a "nonce") and an encoded form of the client's request (e.g., a hash of the request, or the name of a temporary file where the request has been stored), and presents these items to the client as the challenge. The client computes a message authentication code ("MAC") over the challenge, using a secret key shared between the client and the pass-through agent as the MAC key. This MAC is the client's response to the challenge. The pass-through agent can verify it by computing the same MAC using its own copy of the shared key and confirming that it is identical to the client's response. The foregoing challenge/response implementation can be modified slightly to use public and private keys, rather than a shared symmetric encryption key.

Figure 4A:
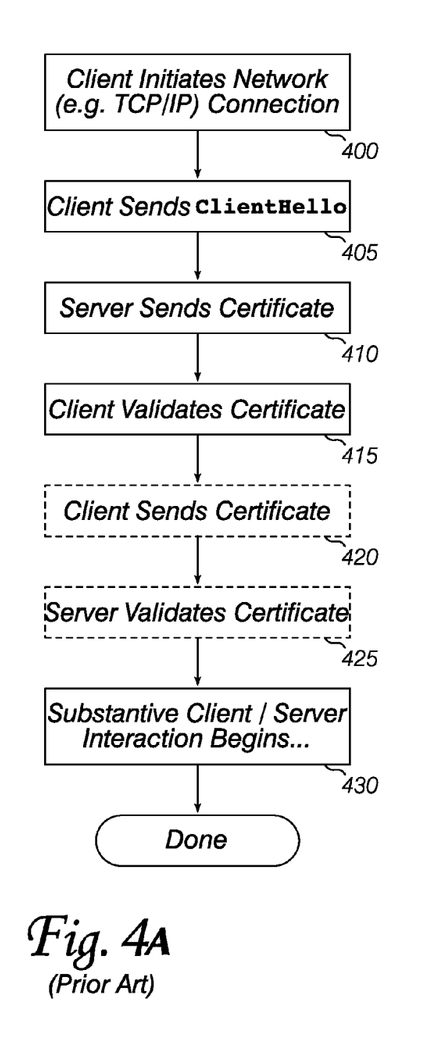
FIG. 4A outlines the establishment of a Secure Sockets Layer ("SSL") connection.

The Secure Sockets Layer, SSL, has been mentioned a number of times as an alternative to an embodiment of the invention. In addition to the inconvenience and expense of modifying an application to use SSL, the inventive protocol offers relaxed administration requirements and addresses different security challenges than SSL. FIG. 4A outlines the interactions between a client and a server to establish an SSL connection. These interactions are contrasted with FIG. 4B, which describes connection establishment according to an embodiment of the invention. In FIG. 4A, the client establishes an initial network connection (e.g., a TCP/IP connection) with the server (400). The client sends a "ClientHello" message to initiate SSL connection negotiation (405). The server sends its certificate (410) and the client validates the certificate (415). Next, the client may send its certificate, if it was requested to do so by the server (420). The server validates the client's certificate (425), and if each party's certificate is acceptable to the other party, subsequent communications can occur over the SSL channel (430). For example, if the client wishes to make a request of the server, it transmits the request now.

Figure 4B:
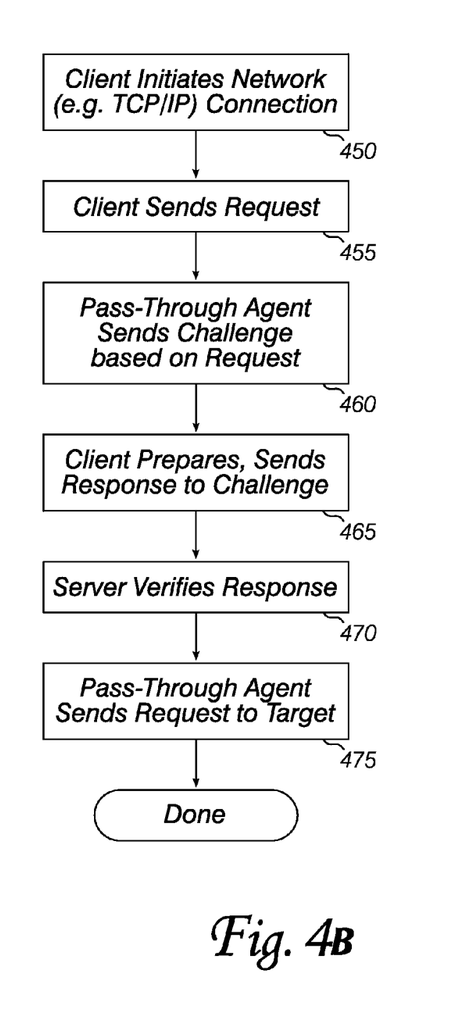
FIG. 4B shows how an embodiment of the invention differs from an SSL connection establishment.

In FIG. 4B, the client establishes an initial network connection (e.g., a TCP/IP connection) with the pass-through agent (450). Then, without further negotiation, the client sends its request (455). The pass-through agent responds with a challenge based on the request (460), and the client responds to the challenge (465). The pass-through agent validates the response (470), and if it is acceptable (i.e., the response establishes that the client possesses a shared or complementary secret), the request is forwarded to the target server (475).

As this side-by-side comparison shows, an SSL connection is established between client and server by a "pre-transaction" protocol interaction. That is, the client cannot issue its request until the exchange and validation of certificates, and other protocol negotiation, completes successfully. Also, the pre-transaction protocol is completely independent of any subsequent client-server interaction—an SSL server does not receive a request from the client and construct a challenge based on the request. Furthermore, SSL's connection negotiation requires the server to present its certificate before demanding a certificate from the client. If the security requirements of the environment are such that only client authentication is important, then the use of SSL imposes an unnecessary burden of preparing and deploying server-side certificates on a system maintainer.

In contrast, an embodiment of the invention omits the pass-through agent's presentation of credentials (so no credentials need be created, distributed, or otherwise managed). Also, the client's request is used in the preparation of the challenge, so the client can confirm that the pass-through agent will do what the client wishes it to do. Only the client authenticates itself in an embodiment of the invention (by solving or otherwise responding correctly to the challenge). The challenge-response protocol using the client's request may be incompatible with the protocol by which the request and reply that will eventually occur between the client and the target server. In other words, the target server may not be able to create a challenge or validate a response, and may not even consider that interaction to be a valid part of its request/reply protocol. The pass-through agent adds a protocol "hiccup" to the standard client/target-server protocol, which permits the identity of the client to be verified.

It is appreciated that an embodiment of the invention can be used between a client and a pass-through server that communicate through an SSL connection. For example, instead of simply establishing a TCP/IP connection and launching into the inventive protocol, the client and pass-through server could engage in the pre-transaction protocol described with reference to FIG. 4A to establish an SSL connection. Either the pass-through agent alone, or both the pass-through agent and the client, may present certificates attesting to their identity. Once the SSL connection is established, the client sends its request, and the pass-through agent responds with a challenge based on the request, as described with reference to FIGS. 2 and 4B. This arrangement may be used to provide additional security (SSL connections are typically encrypted to thwart eavesdroppers) and/or to take advantage of alternate client authentication procedures that are not supported by SSL.

Figure 5:
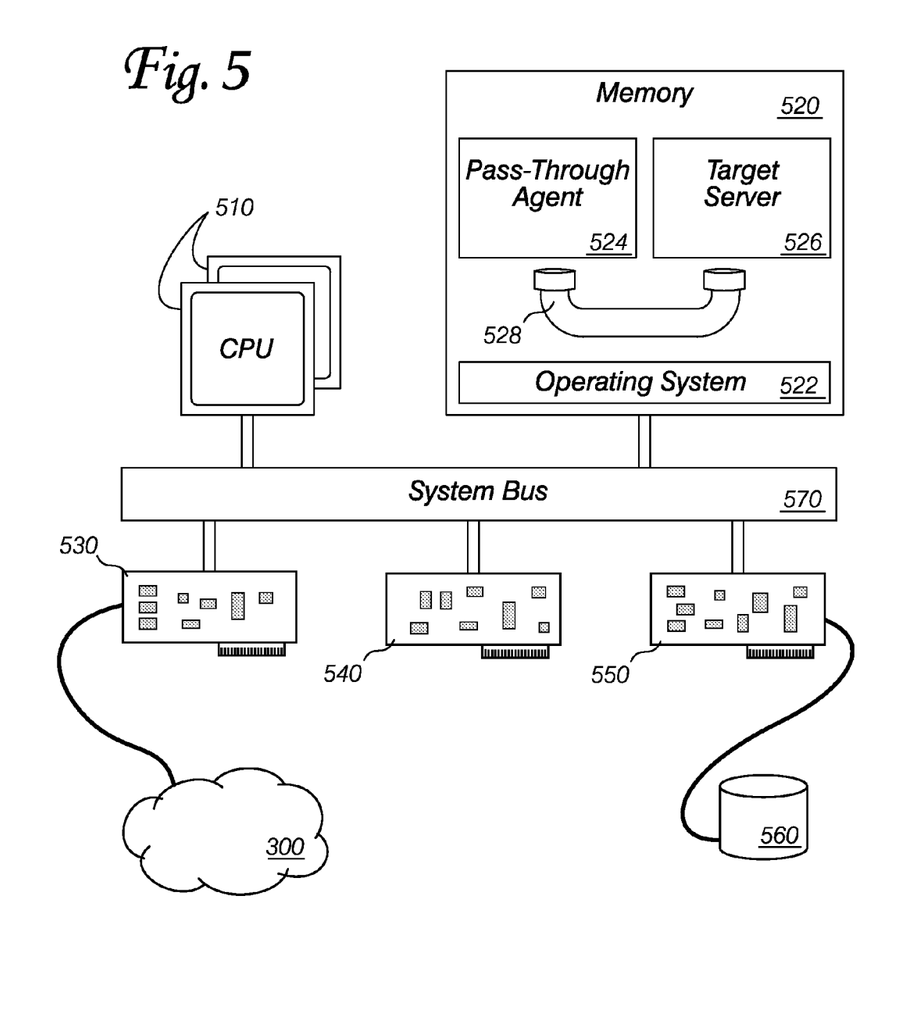
FIG. 5 shows some subsystems and components of a computer system that implements an embodiment of the invention.

FIG. 5 shows some components and subsystems of a computer that implements an embodiment of the invention. One or more programmable processors ("central processing units" or "CPUs") 510 execute instructions stored in memory 520 to perform operations as described above. Memory 520 may contain instructions and data of a number of different software modules, such as operating system 522, pass-through agent 524 and target server 526. The arrangement of pass-through agent 524 and target server 526 is like that shown in FIG. 1C: the pass-through agent and target server communicate via an intra-machine communication facility 528 such as a message queue, shared memory segment, Unix-domain socket or loopback network connection. A network interface card 530 permits the system to communicate with remote machines over a distributed data network 300. A hardware interface 540 may receive signals from local user-interface devices such as a mouse or keyboard (not shown). A mass storage interface 550 permits the system to store and retrieve data on hard disk 560. These components, and others not shown, are connected to a system bus 570, through which they exchange data and control signals.

Figure 6:
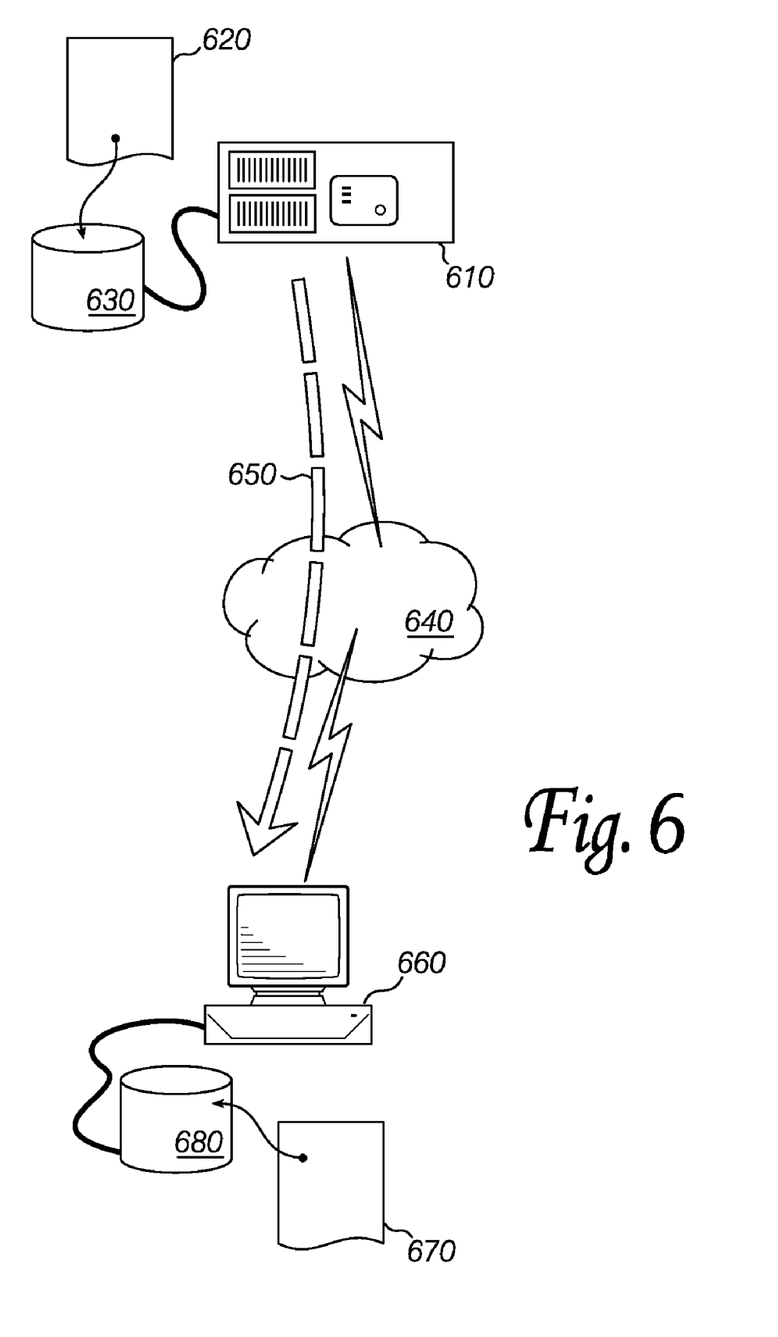
FIG. 6 shows another embodiment of the invention.

FIG. 6 shows two computers that may participate in an embodiment of the invention. A first system 610 has a data object (e.g., a file) 620 containing data and instructions to cause a programmable processor to perform operations according to an embodiment of the invention. File 620 may be stored on a mass storage device 630. However, instead of (or in addition to) executing the instructions at system 610, a carrier signal is encoded at system 610 to carry the data and instructions in file 620. This encoded signal is transmitted (e.g., across a distributed data network 640, as suggested by dashed arrow 650) to a receiving system 660, where the data is extracted from the signal and stored as file 670 on a mass storage device 680. This process results in the creation of a copy 670 of original file 620 at receiving system 660. The copy satisfies the description of "a machine-readable medium storing data and instructions to cause a programmable processor to perform operations" as described above. If system 760 executes those stored instructions, it may perform a method according to another embodiment. Data and instructions 620 and 680 may take various forms, described below.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Executing such an embodiment at the receiver may result in the receiver performing operations according to a third embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that client authentication can also be interposed in existing data communication protocols by software and hardware that distribute the functions of embodiments of this invention differently than herein described. Such variations and implementations are understood to be captured according to the following claims.

I claim:

1. A computer-implemented method comprising:
  receiving a request from a client at a security agent node, the request to be passed through to a target server, the security agent node providing client authentication functionality for the target server that lacks the client authentication functionality;
  constructing, by a processing device, a challenge for the client, the challenge comprising a nonce and an encrypted copy of the request;
  transmitting the challenge to the client;
  receiving a response to the challenge from the client, the response comprising a message authentication code (MAC) computed using the encrypted copy of the request and a shared key;
  verifying the response; and
  when the response is valid, forwarding, by the security agent node, the request received from the client to the target server.

2. The computer-implemented method of claim 1 wherein the target server is incapable of constructing the challenge and verifying the response.

3. The computer-implemented method of claim 1 wherein the target server is incapable of transmitting the challenge and receiving the response.

4. The computer-implemented method of claim 1 wherein forwarding the request to the server comprises transmitting the request via an intra-machine communication channel.

5. The computer-implemented method of claim 4 wherein the intra-machine communication channel is one of Unix-domain socket, a shared memory area, or a localhost network socket.

6. The computer-implemented method of claim 1 wherein the request includes an identifier of the target server, the method further comprising:
  receiving a message from the client; and
  posting a corresponding message to a message queue of the target server at a system where the target server operates.

7. The computer-implemented method of claim 6 wherein the message received from the client is a message describing a user interface event.

8. The computer-implemented method of claim 6 wherein the corresponding message is a message describing a user interface event.

9. A computer-implemented method comprising:
  intercepting, at a security agent node, a request directed to a software agent, the security agent node providing authentication functionality for the software agent that lacks the authentication functionality;
  authenticating, by a processing device of the security agent node, a sender of the request by sending a challenge to the sender, the challenge comprising a nonce and an encrypted copy of the request, and verifying a response from the sender, the response comprising a message authentication code (MAC) computed using the encrypted copy of the request and a shared key; and
  when the authenticating is successful, forwarding the request intercepted at the security agent node to the software agent.

10. The computer-implemented method of claim 9 wherein the software agent responds to requests presented according to a first protocol, and wherein the authentication operation occurs pursuant to a second, different protocol that is incompatible with the first protocol.

11. The computer-implemented method of claim 9 wherein the authenticating operation comprises:
  transmitting a challenge to the sender of the request;
  receiving a response to the challenge from the sender of the request; and
  validating the response.

12. The computer-implemented method of claim 11 wherein the challenge comprises a random number and an encoded form of the request.

13. The computer-implemented method of claim 11 wherein the shared key comprises a shared symmetric encryption key.

14. A system comprising:
  a memory;
  a processing device, coupled to the memory; and
  a security agent, executed from the memory by the processing device, to receive a request from a client, validate the client and pass the request to a service provider via an unauthenticated channel by sending a challenge to the client, the challenge comprising a nonce and an encrypted copy of the request, and verifying a response from the client, the response comprising a message authentication code (MAC) computed using the encrypted copy of the request and a shared key, wherein the security agent provides client authentication functionality for the service provider that lacks the client authentication functionality.

15. The system of claim 14 wherein the service provider and the security agent are processes executing on a programmable processing device.

16. The system of claim 15 wherein the service provider and the security agent are processes executing under control of a Microsoft Windows operating system.

17. The system of claim 15 wherein the service provider and the security agent are processes executing under control of a Unix operating system.

18. The system of claim 14 wherein passing the request to the service provider comprises:
  forwarding the request via a message queue, a local-domain socket or a loopback socket.

19. A non-transitory machine-readable medium storing data and instructions to cause a programmable processing device to perform operations comprising:
  accepting a Transmission Control Protocol/Internet Protocol ("TCP/IP") connection from a client at a security agent;
  receiving, by the processing device of the security agent, a request from the client over the TCP/IP connection;
  sending a challenge to the client over the TCP/IP connection, the challenge comprising a nonce and an encrypted copy of the request;
  receiving a response to the challenge from the client over the TCP/IP connection, the response comprising a message authentication code (MAC) computed using the encrypted copy of the request and a shared key;
  validating the response; and
  when the response is successfully validated, sending, by the security agent the request to a target server, wherein the security agent provides client authentication functionality for the target server that lacks the client authentication functionality.

20. The non-transitory machine-readable medium of claim 19, containing additional data and instructions to cause the programmable processing device to perform operations comprising:

negotiating a Secure Sockets Layer ("SSL") connection after accepting the TCP/IP connection and before receiving the request from the client.

21. The non-transitory machine-readable medium of claim 19, containing additional data and instructions to cause the programmable processing device to perform operations comprising:

receiving a reply to the request from the target server; and sending the reply to the client over the TCP/IP connection.

22. The non-transitory machine-readable medium of claim 19 wherein sending the request to the target server comprises posting a synthetic event to an event queue of the target server.

* * * * *